Aug. 21, 1962     H. H. DUERR     3,049,967

COLOR BALANCE AND DENSITY EVALUATION DEVICE

Filed Dec. 16, 1957

INVENTOR.
HERMAN H. DUERR
BY

ATTORNEYS

3,049,967
COLOR BALANCE AND DENSITY EVALUATION DEVICE
Herman H. Duerr, Binghamton, N.Y., assignor to General Aniline & Film Corporation, New York, N.Y., a corporation of Delaware
Filed Dec. 16, 1957, Ser. No. 703,042
4 Claims. (Cl. 88—24)

This invention relates generally to photographic printing apparatus and method and, more particularly, to improvements in the evaluation of color negative material for printing purposes.

A particular feature of this invention is the provision of a simple density evaluation mask to be used in conjunction with additive color printers.

A particular advantage of the invention is that, by the use of a novel density evaluation mask weighed, average values may be applied to the areas of greater pictorial interest in a negative having great density variation due to high contrast.

It is a further advantage of the invention that, by simple conventional means, the exposure may be timed automatically in a photographic printing apparatus by the amount of light transmitted through the density evaluation mask.

Essentially, the invention contemplates the use of a mask having a large opening corresponding to the area of greatest pictorial interest in the negative and smaller openings corresponding to areas of lesser pictorial interest. This mask, referred to as a "subject interest mask," as will be further described, may be used in conjunction with standard additive color printing apparatus, requiring but slight modification, for the purpose of determining the proper color balance and exposure time for each color.

Figure 1:
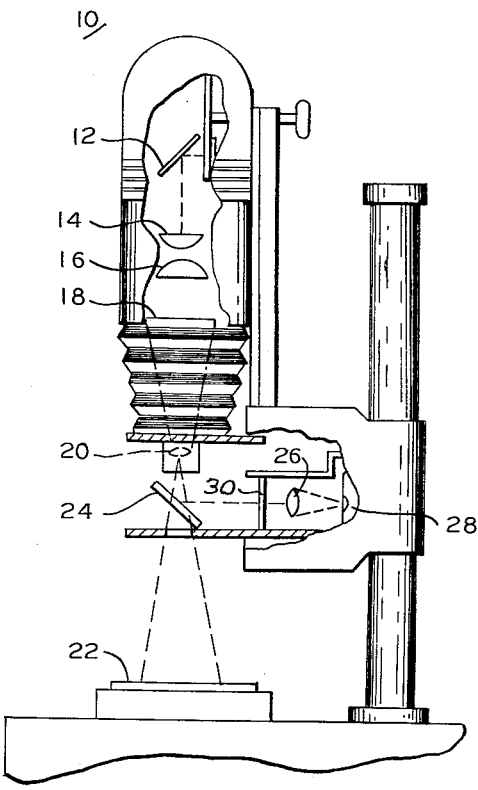
Figure 2:
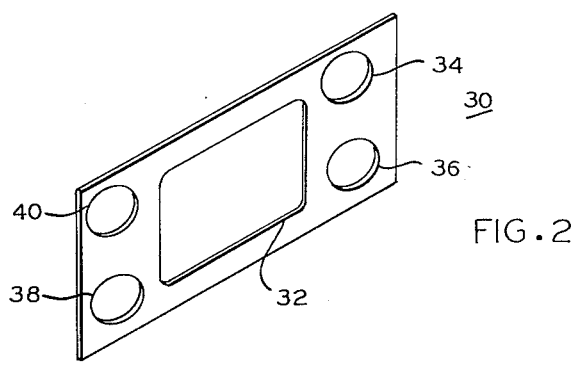

Other features and advantages will be apparent from the following description of the invention, pointed out in particularlity in the appended claims and taken in connection with the accompanying drawing, in which:

FIG. 1 is a side elevational view of a photographic printing apparatus incorporating this invention; and FIG. 2 is a perspective view of a density evaluation mask embodying this invention.

In the printing of color negative material, the additive method of exposure through red, green and blue filters, requires that the exposure time or the light intensity be determined for each filter in order to obtain proper color balance in the print. Where such prints are made on a commercial scale, the evaluation of the exposure and the correlated printing time is obtained by photoelectric means. Essentially, a portion of the light which transilluminates the negative is diverted onto a photoelectric tube which, through associated circuits, discharges a condenser in accordance with the light value obtained and the discharge of the condenser effects the exposure time. This allows for the automatic timing of the exposure and also provides for the proper color balance control. However, a negative with great density variation due to the relatively high contrast of the subject matter can affect the accuracy of the timing as well as the color balance correction. For instance, if there are large sky areas of high density in the negative together with low foreground densities, the overall integration of such a negative will not produce the best possible print. It is, therefore, very desirable to provide ways and means of applying weighed average values to the areas of greatest pictorial interest.

On the basis of statistical evaluations, it has been determined that the center of interest in a picture negative is in the middle of the picture area generally in a rectangular pattern, the long sides of which tend to correspond to the long side of the negative.

A mask is prepared with a cutout corresponding to the area of greatest pictorial interest. The amount of light passing through this area is selected to be about 40–70% of the total amount which reaches the photoelectric tube. The sky area is measured by having relatively small cutouts in the mask in the general location of the sky, and the foreground by similar cutouts in the lower portion. The amount of light from the small cutouts may be 10–30% of the light reaching the phototube.

Referring to FIG. 1, a conventional photographic printing apparatus 10 is shown by way of example modified to accommodate the subject interest mask. It includes a light source (not shown) which projects a beam of light onto mirror 12 from which the light is reflected to condenser lenses 14 and 16. The light is then transmitted through negative 18 and is focused and projected by projection lens 20 onto the photosensitive paper 22.

Interposed between the lens 20 and the paper 22 is a beam splitter 24, such as a dichroic mirror, which reflects some of the printing light at right angle to the main path of light. This reflected light is then collected by an optical system designated by the lens 26 and focused on a phototube 28 which may either be connected to an electric circuit and meter indicating the required exposure time or as mentioned before to a time exposure mechanism so that the exposure is controlled automatically by the amount of light falling upon phototube 28. Such photoelectric circuits are conventional and form no part of the present invention; therefore, illustration thereof has been omitted.

The density evaluation mask or subject interest mask 30 is inserted in the reflected light beam between beam splitter 24 and phototube 28. Mask 30 has a large rectangular opening 32 which corresponds to the area of greatest pictorial interest in the negative. On each side of opening 32 there are two smaller circular openings designated as 34, 36, 38 and 40. These smaller openings correspond to the sky and foreground of the negative. Mask 30 is inserted in the path of the reflected light so that the portion of the light beam incorporating the area of greatest pictorial interest passes through rectangular opening 32 while the portions of the reflected light beam incorporating the background areas of the image pass through the smaller circular openings at the side of the large rectangular opening. The amount of light passing through opening 32 in mask 30 is selected to amount to 40–70 percent of the total amount of light which reaches the photoelectric cell.

From the above description, it is apparent that this density evaluation mask or subject interest mask 30 will pass only the light from the important picture areas in the negative and in the desirable ratio, as found by statistical methods, to be used for the color evaluation and exposure timing during the printing exposure. In this manner, the mask 30 contributes also to a great extent to the control of color balance in the additive color printing process. At present it is standard practice to adjust the three-color exposures, such as red, green and blue, to the average color temperature of a negative which is approximately 5,800° Kelvin. A color negative which is predominant in one or the other color in certain areas will not average to this color temperature. With the use of the mask herein described, the average color balance will be easier to maintain in that the effect of large areas of any single color will be minimized.

It is to be understood that only one embodiment of this invention has been described above and illustrated in the drawings and is not to be considered limiting as to the scope of the invention which is more particularly recited in the appended claims.

I claim:
1. In a photographic printing apparatus having photoelectric means for evaluating the exposure time in accord- ance with the light value reaching a phototube from transillumination of the negative, a mask having a large opening corresponding to the area of greater pictorial interest in the negative and at least one smaller opening representing the area of lesser interest, said mask being positioned in the path of light reaching said phototube whereby said mask modifies said transilluminating light in accordance with the ratio of light passing simultaneously through the two areas.

2. A mask, as defined in claim 1, in which said large opening is substantially rectangular and said smaller opening is substantially circular.

3. A mask, as defined in claim 1, having a plurality of smaller openings surrounding said large opening.

4. A mask, as defined in claim 1, in which the openings are of such size that the amount of light transmitted through said large opening is 40–70 percent of the total light passing through the mask.

References Cited in the file of this patent

UNITED STATES PATENTS

| | | |
|---|---|---|
| 70,564 | Heddon | Nov. 5, 1867 |
| 1,411,370 | Nordin | Apr. 4, 1922 |
| 2,749,799 | Strem | June 12, 1956 |

FOREIGN PATENTS

| | | |
|---|---|---|
| 472,147 | Great Britain | Sept. 17, 1937 |
| 713,285 | Great Britain | Aug. 11, 1954 |
| 509,253 | Italy | Jan. 13, 1955 |
| 813,465 | France | Feb. 22, 1937 |
| 957,112 | France | Aug. 22, 1949 |
| 1,132,163 | France | Oct. 29, 1956 |